United States Patent [19]

Kishi et al.

[11] Patent Number: 4,523,270
[45] Date of Patent: Jun. 11, 1985

[54] METHOD AND DEVICE FOR CREATING CURVED SURFACES

[75] Inventors: Hajimu Kishi, Hino; Masaki Seki, Tokyo, both of Japan

[73] Assignee: Fanuc Ltd, Minamitsuru, Japan

[21] Appl. No.: 413,331

[22] PCT Filed: Dec. 23, 1981

[86] PCT No.: PCT/JP81/00402
§ 371 Date: Aug. 23, 1982
§ 102(e) Date: Aug. 23, 1982

[87] PCT Pub. No.: WO82/02434
PCT Pub. Date: Jul. 22, 1982

[30] Foreign Application Priority Data

Dec. 30, 1980 [JP] Japan .............................. 55-186733

[51] Int. Cl.$^3$ ...................... G06F 15/46; G05B 19/42
[52] U.S. Cl. .................................... 364/191; 318/568; 364/171; 364/474
[58] Field of Search ................ 364/474, 475, 167–171, 364/191–193, 512; 318/568, 527, 569, 570

[56] References Cited

U.S. PATENT DOCUMENTS

| | | | |
|---|---|---|---|
| 3,857,025 | 12/1974 | English et al. .................. | 364/193 X |
| 4,010,356 | 3/1977 | Evans et al. .................... | 364/474 X |
| 4,152,765 | 5/1979 | Weber ............................. | 364/191 X |
| 4,163,284 | 7/1979 | Kishi et al. ..................... | 364/191 X |

OTHER PUBLICATIONS

Clark–"Designing Surfaces in 3-D"–Communications of the ACM–Aug. 1976, vol. 19, No. 8.
Society of Automotive Engineers 449A, Automotive Engineering Congress, Detroit, Mich. (1962-1) (New York) J. B. Rankin, "Computers and Numerical Control", p. 4, FIG. 10.
Kishi Hajime, "NC Software" (1972-11) Kogyo Chosaki Kabushiki Kaisha, p. 191, line 11 to p. 197, line 27.

*Primary Examiner*—Joseph Ruggiero
*Attorney, Agent, or Firm*—Staas & Halsey

[57] ABSTRACT

A memory is provided with an input of such data as section data and section curve data provided on a blueprint, and a cylindrical intermediate section generating device generates an intermediate section based on the data in accordance with a cylindrical intermediate section generating method selected from a plurality of such methods. A cylindrical intermediate section curve generating device generates an intermediate section curve based on the data in accordance with a cylindrical intermediate section curve generating method selected from a plurality of such methods. A tape creation control unit effects a conversion into a machine tool NC tape format based on the intermediate section and section curves.

13 Claims, 34 Drawing Figures

METHOD AND DEVICE FOR CREATING CURVED SURFACES

DESCRIPTION

1. Technical Field

This invention relates to a method of creating the curved surface of a three-dimensional body and, more particularly, to a method of creating curved surfaces that is ideal for the preparation of a numerical control tape required for the numerically controlled machining of a three-dimensional metal mold or the like.

2. Background Art

A curved surface of a three-dimensional metal mold or the like, when drawn out on the plane of a blueprint, is generally represented by a plurality of given section curves, but no data is shown for the shape of the area lying between a certain section curve and the next adjacent section curve. When carrying out numerically controlled machining it is essential that these two section curves be connected smoothly despite the fact that the shape of the area between them is not given. In other words, this means that machining must be performed by generating the curved surface between the two section curves from such data as that indicative of the section curves, punching an NC tape so as to incorporate the data concerning the generated curved surface, and then machining the workpiece in accordance with the instructions on the NC tape. To this end, the numerical control tape ordinarily is prepared by using a computer, and either of two methods can be adopted to create the curved surface, namely (1) a patch system in which processing is executed by partitioning a curved surface into minute portions, and (2) a system in which a two-dimensional curve made of straight line segments and arcs is modified for each pick-feed applied to a third axis.

The patch system (1), however, entails the processing of large quantities of data as well as highly complicated mathematical processing, and requires a large-scale computer system. The system (2) makes processing with a small-scale computer possible, but there is no three-dimensional tool offset capability and an excessive limitation upon tool movement direction and machining shape, making it impossible to create sophisticated three-dimensional bodies.

Accordingly, the inventors have already proposed a method of creating curved surfaces, comprising generating a plurality a planar intermediate sections and finding a section curve in each intermediate section, in accordance with predetermined rules, from section data specifying given sections (sections lying on planes) of a three-dimensional body and from data specifying section curves in said sections, and generating the curved surface of the three dimensional body based on each of the section curves in the plurality of generated intermediate sections. In accordance with such method, processing can be carried out with a small-scale computer and a sophisticated three-dimensional body can be created in a simple manner.

Nevertheless, according to the aforementioned previously proposed method of creating curved surfaces, a disadvantage is that the curved surface of a three-dimensional body cannot be created in a case where the given data is section data specifying cylindrical sections and section curve data for curves in the cylindrical sections. More specifically, for machining a three-dimensional metal mold or the like, it is required to machine, say, a curved surface SS1 bounded by curves CV1 through CV4, as shown in FIG. 1. The curved surface SS1 is bounded, however, by the curves CV1, CV2 (namely cylindrical section curves) lying on the surfaces of respective first and second cylinders CYL1, CYL2, by planes PL1, PL2, and by the curves CV3, CV4 (namely planar section curves) in the respective planes PL1, PL2. In consequence, the curved surface SS1 cannot be created with the method of creating curved surfaces previously proposed.

SUMMARY OF THE INVENTION

The object of the present invention is to provide a novel method of creating curved surfaces in which, in a case where cylindrical sections and the section curves lying in the cylindrical sections are given, the curved surface bounded by these section curves can be created in a simple manner, and in which processing is capable of being executed by a small-scale computer. The present invention creates a curved surface from a plurality of section curves that are classified broadly into given cylindrical section curves and reference curves. In creating the curved surface, the given cylindrical section curves are those which serve as the basis for generating cylindrical intermediate section curves. The reference curves are those which are utilized in determining the positions of the cylindrical intermediate sections and in deciding the shapes of the cylindrical intermediate section curves. In generating the curved surface, the inputs to the processor of a computer are section data relating to sections and reference surfaces, and section curve data relating to section curves and reference curves, these items of data appearing on a blueprint. Upon being supplied with these items of data, the processor executes processing for creating the curved surface, namely processing for generating cylindrical intermediate sections, cylindrical intermediate section curves, and the curved surface proper.

According to the present invention, two methods of generating cylindrical intermediate sections are disclosed, as well as four methods of executing the processing for generating the cylindrical intermediate section curves in accordance with which sections have their section curve data given on the blueprint to specify the cylindrical intermediate section curves. Processing for generating these cylindrical intermediate sections and cylindrical intermediate section curves is then repeated a number of times to connect the given section curves which have been obtained, thereby creating a smooth curved surface.

BRIEF DESCRIPTION OF THE DRAWINGS

FIG. 1 is an illustrative view of a curved surface bounded by cylindrical section curves and the like;

DESCRIPTION OF PREFERRED EMBODIMENTS

For a fuller understanding of the present invention, reference will now be had to the accompanying drawings to describe an embodiment of the invention in detail.

Figure 1:
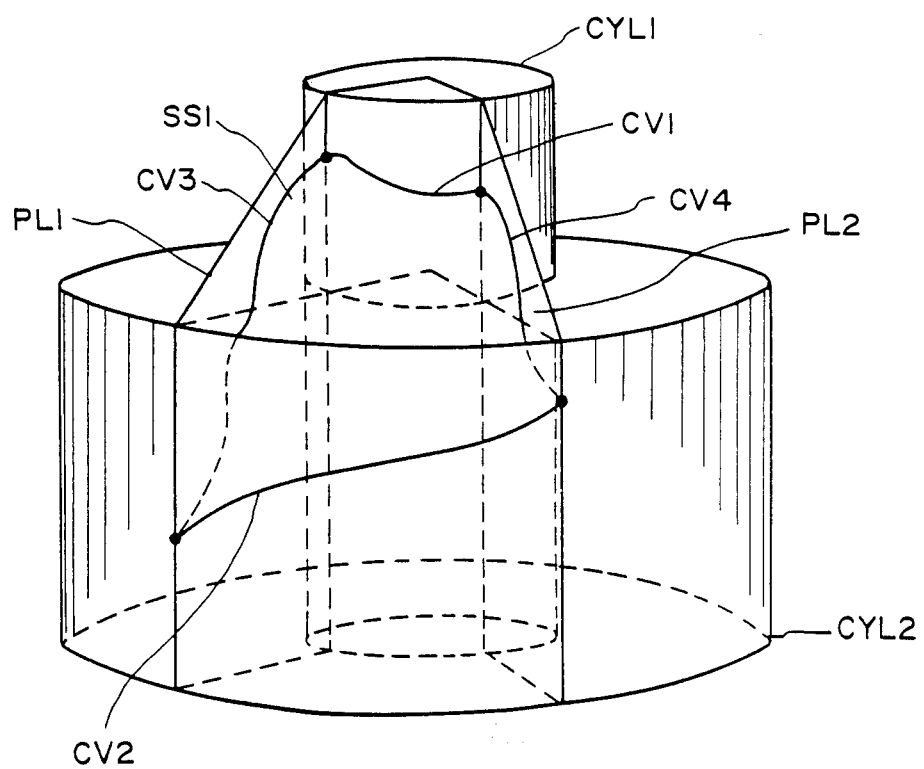
Figure 2A:
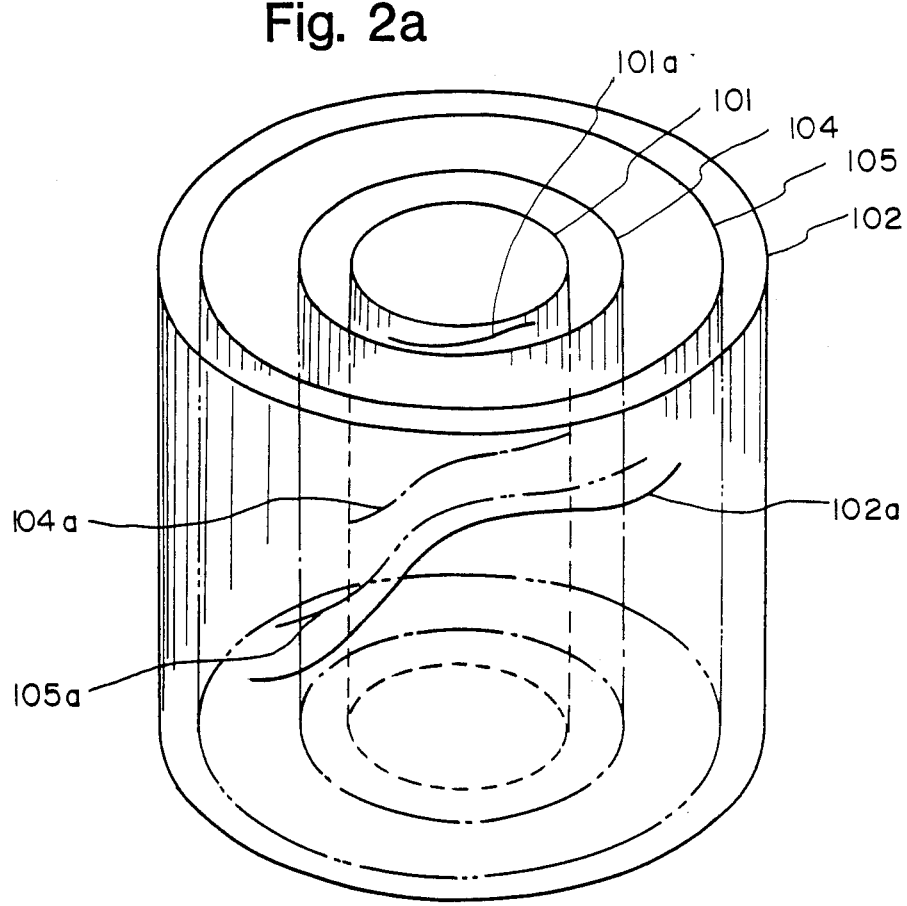
FIGS. 2(a) and 2(b) are an illustrative views for describing, in simplified form, the creation of a surface according to the present invention.
Figure 2B:
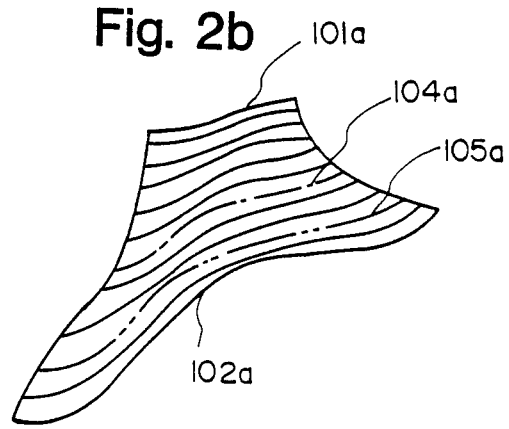

FIG. 2(a) is a schematic illustrative view for describing a method of creating a surface according to the present invention. In accordance with the invention, a curved surface is created through the following steps. It will be assumed that two cylindrical sections and section curves lying in these cylindrical sections are given. The steps are:

(1) generating a plurality of cylindrical intermediate sections 104, 105 . . . between cylindrical sections 101, 102 that are given (referred to as given cylindrical sections);

(2) generating cylindrical intermediate section curves 104a, 105a, lying in respective ones of the cylindrical intermediate sections generated in step (1), from given cylindrical section curves 101a, 102a that lie in the given cylindrical sections 101, 102; and (3) generating the curved surface [FIG. 2(b)] in the form of a continuous series of cylindrical intermediate section curves upon finding these cylindrical intermediate section curves 104a, 105a . . . in a number of the cylindrical intermediate sections.

The method of creating curved surfaces according to the present invention is therefore based upon generating both cylindrical intermediate sections and cylindrical intermediate section curves on the surfaces of these cylindrical intermediate sections, in a manner as described above.

Figure 3:
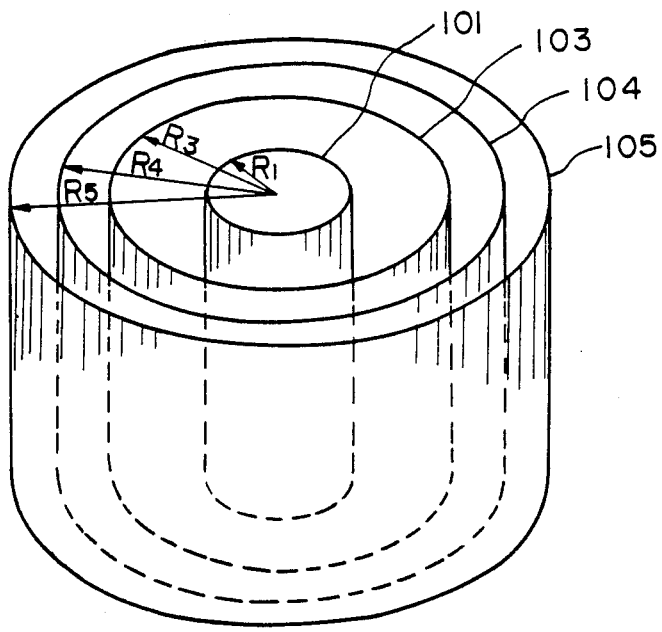
FIGS. 3, 4(a) and 4(b) are illustrative views for describing methods of generating intermediate sections according to the present invention.
Figure 4A:
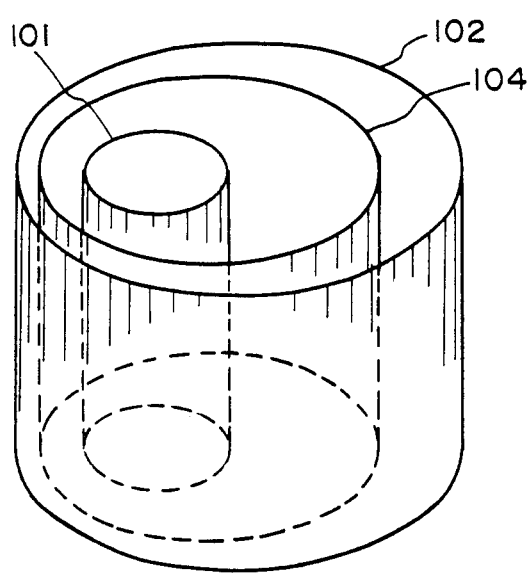
Figure 4B:
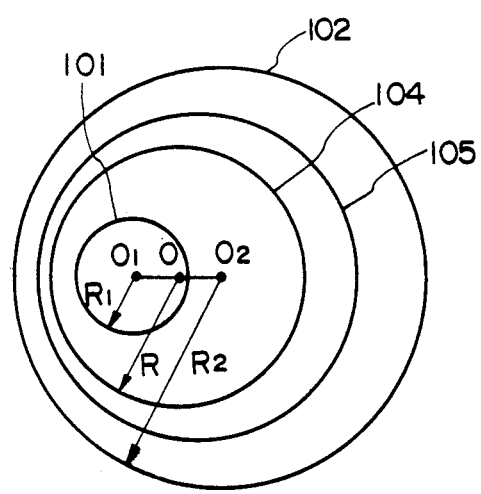

As shown in FIGS. 3, 4(a) and 4(b), there are two methods of generating cylindrical intermediate sections in accordance with the given sections and section curves drawn out on a blueprint.

(1) When one cylindrical section is given:

In a case where one cylindrical section 101 is given, cylindrical intermediate sections 104, 105, 106 . . . are generated concentrically with respect to the given cylindrical section 101 (FIG. 3) [Method I of generating cylindrical intermediate sections].

(2) When two or more cylindrical sections are given:

In a case where two cylindrical sections 101, 102 of radii R1, R2 are given having their central axes O1, O2 lying in parallel, with one of the given cylindrical sections 101 being contained in the other given cylindrical section 102, cylindrical intermediate sections 104, 105 are generated in such a manner that the central axis O is shifted successively from central axis O1 to central axis O2, that the radius R grows successively larger from R1 to R2, and that the generated cylindrical intermediate sections do not intersect the cylindrical sections 101, 102 FIGS. 4(a) and 4(b) [Method II of generating cylindrical intermediate sections].

Figure 5A:
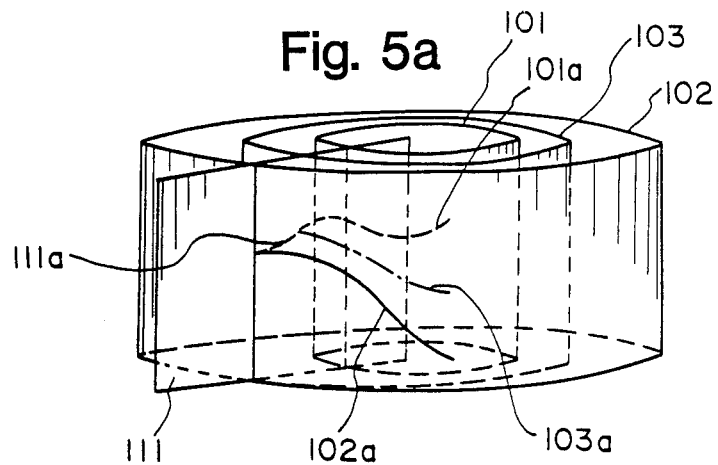
FIGS. 5(a) to 5(d) are illustrative view for describing a method of generating a cylindrical intermediate section curve according to the present invention.
Figure 5B:
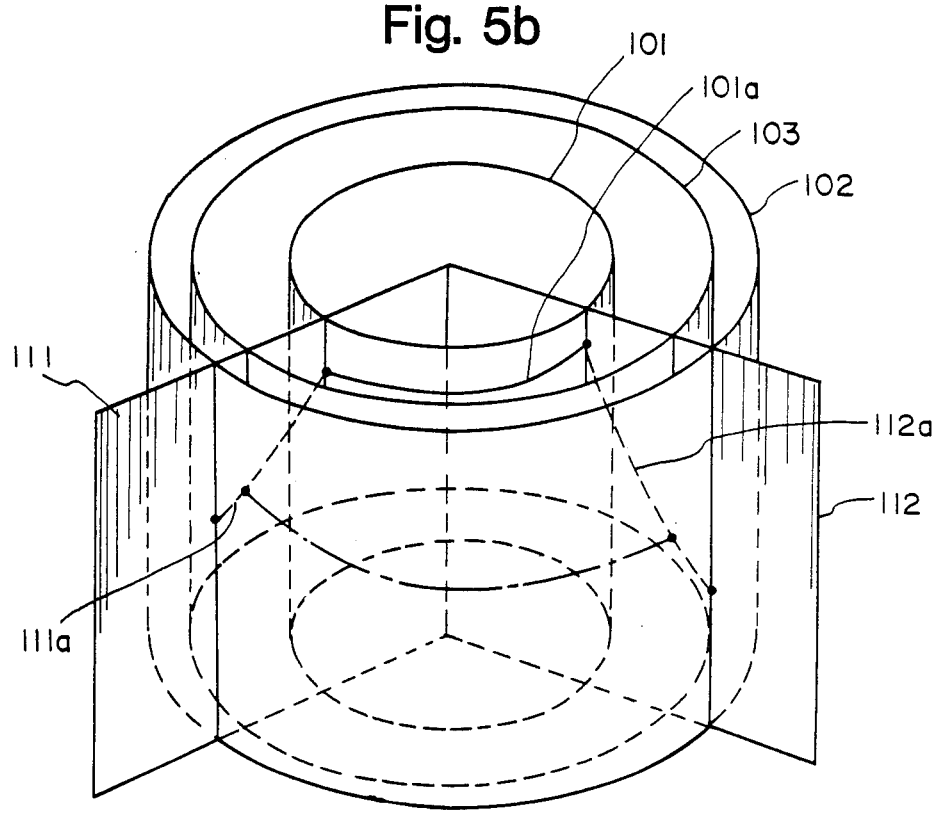
Figure 5C:
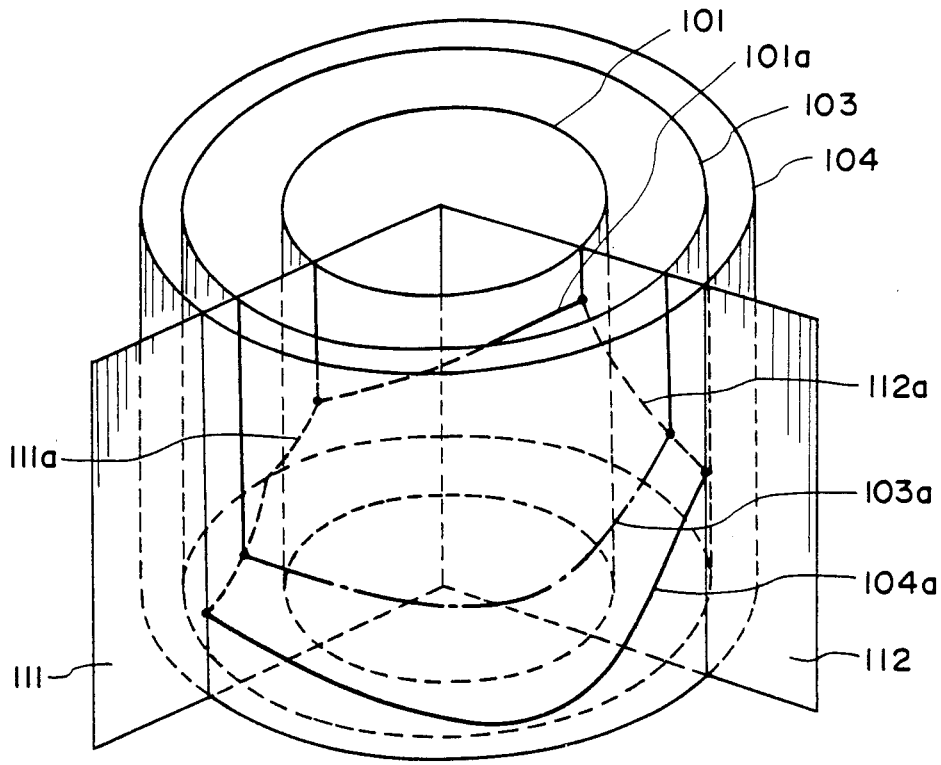
Figure 5D:
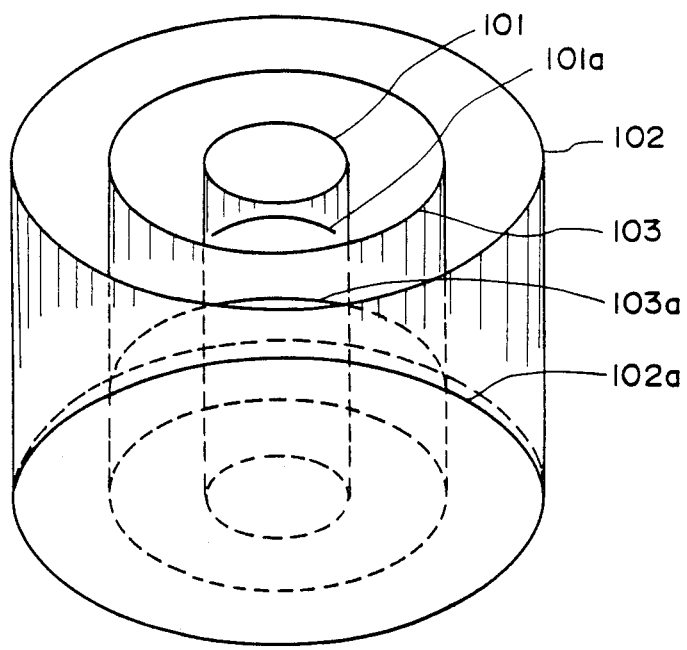

As shown in FIGS. 5(a) to 5(d), there are four methods of generating cylindrical intermediate section curves in accordance with the section curves similarly drawn out on the plane of the blueprint. The methods are as follows:

(1) generating a cylindrical intermediate section curve 103a in the cylindrical intermediate section 103 from the two given cylindrical section curves 101a, 102a and a reference curve 111a given on one planar reference surface 111 [FIG. 5(a)] [Method I of generating cylindrical intermediate section curves];

(2) generating the cylindrical intermediate section curve 103a in the cylindrical intermediate section 103 from one given cylindrical section curve 101a and reference curves 111a, 112a given in two planar reference surfaces 111, 112 [FIG. 5(b)] [Method II of generating cylindrical intermediate section curves];

(3) generating the cylindrical intermediate section curve 103a in the cylindrical intermediate section 103 from the two given cylindrical section curves 101a, 102a and the reference curves 111a, 112a given in the two planar reference surfaces 111, 112 [FIG. 5(c)] [Method III of generating cylindrical intermediate section curves]; and (4) generating the cylindrical intermediate section curve 103a in the cylindrical intermediate section 103 from the two given cylindrical section curves 101a, 102a [FIG. 5(d)] [Method IV of generating cylindrical intermediate section curves].

The foregoing is a general description of the inventive method of created curved surfaces. With this as a background, the present invention will now be described in greater detail.

The present invention generates surfaces from a plurality of section curves, these being classified into "given cylindrical section curves" and "reference curves" depending upon differences in their manner of use. Specifically, a "given cylindrical section curve" is a section curve obtained when a curved body is cut by a given cylindrical section, while a "reference curve" is a section curve obtained when a curved body is cut by a given planar surface. In the creation of a curved surface, a given cylindrical section curve is a curve upon which the generation of a "cylindrical intermediate section curve" is based. The reference curve is a curve utilized to decide the position of a cylindrical intermediate section and to determine the shape of a cylindrical intermediate section curve. Hereafter, a plane which contains a reference curve is referred to as a "reference surface", a surface which contains the given cylindrical section curve is referred to as a "given cylindrical surface", and a surface which contains a cylindrical intermediate section curve is referred to as an "intermediate cylindrical surface".

Figure 6A:
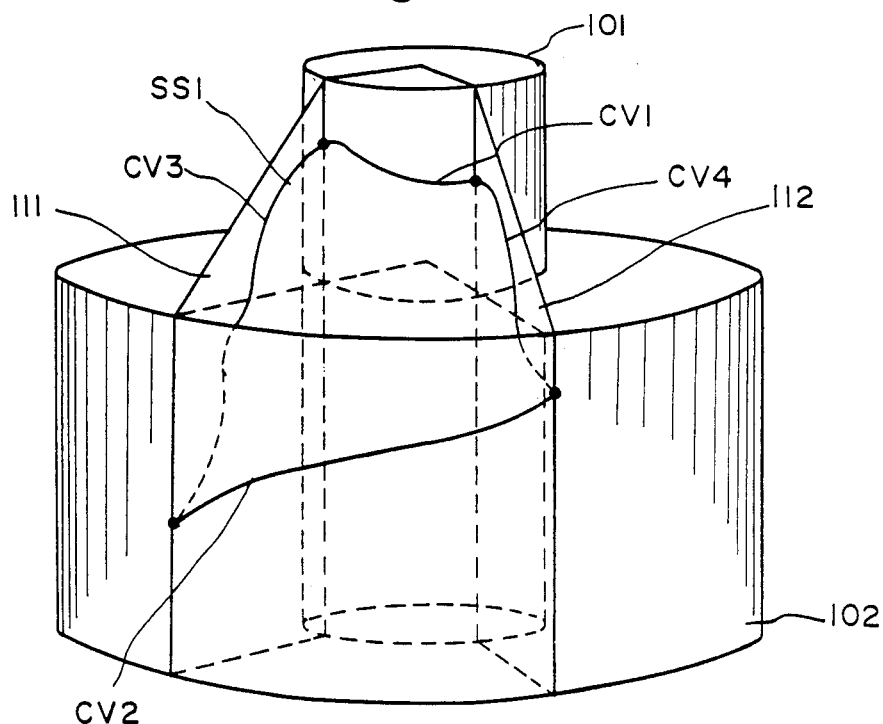
FIGS. 6(a) and (b) are an illustrative views for describing a method of entering data.

When creating a curved surface, a processor, which will be described later, must be supplied with input data, specifically section data relating to the sections and reference surfaces represented on the plane of a blueprint, and section curve data relating to the section curves and reference curves which are also drawn out on the blueprint. A data input method in accordance with the present invention will now be described assuming that the curved surface to be created is the curved surface SS1 shown in FIG. 6(a).

[I] Data input processing

{1} Inputting of curves CV1, CV2, CV3 and CV4

Figure 6B:
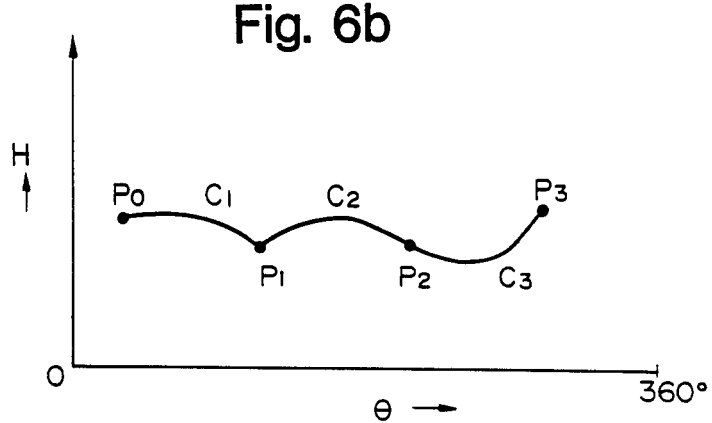

(1) One side surface of cylindrical surface 101 is cut and developed, and the given cylindrical section curve CV1 is transformed to place it in an H-θ plane. It should be noted that the θ-axis indicates the angle of rotation from 0 to 360 degrees when the cut side surface is at 0 degrees, and that the H-axis indicates the height from the origin. Here we shall assume that the given cylindrical section curve CV1 is composed of a series of three connected arcs C1, C2, C3, as shown in FIG. 6(b), and that the starting and end points of each arc C1, C2, C3 are (P0, P1), (P1, P2), (P2, P3), respectively. Further, if we adopt CV1 as the term for the given cylindrical section curve on the cylindrical surface 101, then the section curve CV1 is defined in the following manner and then fed into the processor:

CV1 = *
P0 ( . . . . )
C1 ( . . . . ), P1 ( . . . . )
C2 ( . . . . ), P2 ( . . . . )
C3 ( . . . .), P3 ( . . . . )

The center and radius of the arc Ci are specified within the parentheses following Ci, and the coordinates of the point Pi are specified within the parentheses following Pi.

(2) Next, the terms CV2, CV3, CV4 are similarly assigned to the section curves in the given cylindrical section 102 and reference surface 112, and these section curves are defined in the manner described above and then fed into the processor.

It should be noted that while three connected arcs were taken as constructing the given cylindrical section curve CV1, a section curve CVi generally is not limited to arcs alone but is defined as a curve composed of line segments and a given series of points which are smoothly connected.

After the section curves CVi (i=1,2,3,4) in the respective sections have been defined by observing the aforementioned steps (1) and (2) and then applied to the processor as inputs, the curved surface SS1 is defined as shown below using the aforesaid section curves, and is then fed into the processor.

{2} Entry of surface SS1

The entry of the curved surface SS1 is performed after the curved surface has been defined in the following manner:

SS1 = 1222, BC1 (CV3, . . . ),, BC2 (CV4, . . . ),, DC1 (CV1, . . . ),, DC2 (CV2, . . . ).

Here the number 1222 is a type number that represents the type of curved surface that is to be generated; it allows curved surfaces of various types to be specified in accordance with the particular objective. BC1 (CV1, . . . ) represents a reference curve. The curve CV1 is already defined. The same is true for BC2 (CV2, . . . ). DC1 (CV3, . . . ) and DC2 (CV4, . . . ) are indicative of given cylindrical section curves. It should be noted that data specifying the cylindrical shape, such as the direction of the central axis, the radius and the position of the origin, is defined within the parentheses following DCi.

The processor, once provided with the input data, begins processing to create the curved surface. This is done by performing the processing for cylindrical intermediate section generation, for cylindrical intermediate section curve generation and, finally, for generation or creation of the curved surface.

[II] Processing for cylindrical intermediate section generation

A cylindrical intermediate section is generated through use of the Methods I or II of generating cylindrical intermediate sections, described above, in accordance with given section data and given section curve data obtained from a blueprint (which data has already been fed into the processor by the data input processing step [I]). Further, the cylindrical intermediate section is specified by "intermediate section information". The latter contains "section-related information" which indicates what the ordinal number of the obtained cylindrical intermediate section in the desired curved surface is, and "section position information", such as a transformation matrix, which indicates how to transform a specific coordinate system to obtain the derived cylindrical intermediate section.

The methods of generating a cylindrical intermediate section will be described next.

(1) Method I of generating a cylindrical intermediate section

As mentioned earlier, in a case where one cylindrical section (given cylindrical surface) 101 is given (FIG. 3), cylindrical intermediate sections 103, 104, 105 . . . are generated concentrically with respect to the given cylindrical surface 101. Thus, if we let R1 denote the radius of the given cylindrical surface and let R3, R4, R5 . . . denote the radii of the cylindrical intermediate sections 103, 104, 105 . . . , respectively, then the intermedate cylindrical sections 103, 104, 105 . . . should be generated so as to achieve concentricity and satisfy the relationship $R1 < R3 < R4 < R5$.

(2) Method II of generating a cylindrical intermediate section

As mentioned earlier, in a case where two cylindrical surfaces 101, 102 (FIG. 4(a)) are given, the cylindrical intermediate section 103 is generated in such a manner that the central axis O is shifted successively from central axis $O_1$ to central axis $O_2$, that the radius R grows successively larger from R1 to R2, and that the central axes remain in parallel. In other words, letting $O_1O$:$OO_2$=m:n in FIG. 4(b), the intermediate cylindrical section 103 is generated so as to have the radius R given by the following equation:

$$R = R1 + m(R2 - R1)/m + n \qquad (1)$$

If m/n is successively increased from 0:1 to 1:0, then intermediate cylindrical sections will be generated one after another. It should be noted that the generated intermediate cylindrical section will coincide with the given cylindrical surface 101 when m:n=0:1 holds, and with the given cylindrical surface 102 when m:n=1:0 holds.

After the intermediate cylindrical surface has been generated by Method I or II described above, processing is executed for the generation of a cylindrical intermediate section curve lying on the intermediate cylinder.

[III] Processing for cylindrical intermediate section curve generation

A cylindrical intermediate section curve is generated by any one of the following methods I through IV of cylindrical intermediate section curve generation in accordance with the given section curve data of the particular section on the blueprint. The following procedure is followed for each method:

(1) obtaining the desired intermediate section-related information;

(2) transforming each given cylindrical section curve, as well as the interval formed by two reference curves, in such fashion that they lie on the same predetermined plane (H-$\theta$ plane);

(3) generating a cylindrical intermediate section curve on the plane into which the transformation has been made (H-$\theta$ plane); and (4) transforming the cylindrical intermediate section curve on the H-$\theta$ plane into one which lies in the desired intermediate cylindrical section in space.

(1) Method I of generating a cylindrical intermediate section curve

Figure 7A:
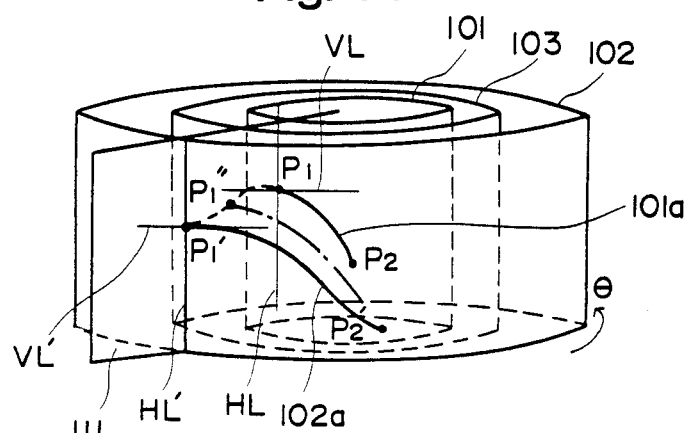
FIGS. 7(a) to 7(f) are illustrative views for describing a method I of generating a cylindrical intermediate section curve.

Method I of cylindrical intermediate section curve generation is applicable to a case where data relating to two cylindrical section curves and one reference curve is given, as shown in FIG. 7(a). Hereafter reference will be had to FIGS. 7(b) to 7(f) to describe the procedure for generating a cylindrical intermediate section curve according to Method I.

(1) Section-related information (the dividing ratio m/n) concerning the desired intermediate cylindrical surface 103 is obtained.

Figure 7B:
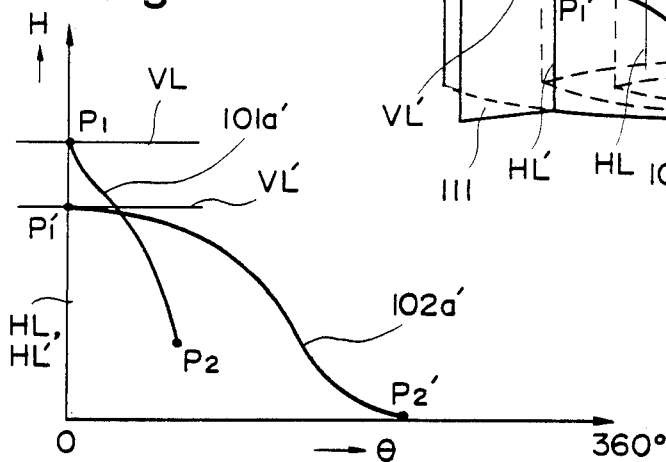

(2) The given cylindrical section curves 101a, 102a on the given cylindrical surfaces 101, 102 are transformed so as to lie on the same plane (on the H-$\theta$ plane) [FIG. 7(b)]. It should be noted that the given cylindrical section curves 101a, 102a can be considered to be curves on the same H-$\theta$ plane by performing the following operations (2-1) through (2-3) after the curves 101a, 102a are transformed into the H-$\theta$ plane.

(2-1) The points of intersection P1, P1' of the reference curve 111a and both given cylindrical surfaces 101, 102 are made the same point.

(2-2) The lines of intersection HL, HL' of the reference section 111 and the given cylindrical surfaces 101, 102 are partitioned by the points of intersection P1, P1'. Of these partitioned segments, those that have the same direction with respect to the reference curve 111a are superposed.

(2-3) When straight lines VL, VL', which pass through the points of intersection P1, P1' of the reference curve 111a and the given cylindrical surfaces and which at the same time are perpendicular to the lines HL, HL', are considered, it is seen that these straight lines VL, VL' are partitioned by the points of intersection P1, P1', respectively. Of these partitioned segments, those that have the same direction with respect to the reference curve 111a are superposed. That is, when the given cylindrical surfaces 101, 102 are cut along the respective lines of intersection HL, HL' and then developed into a plane, the transformation into an identical plane is achieved by superposing VL, VL' and HL, HL' and P1, P1'.

Figure 7C:
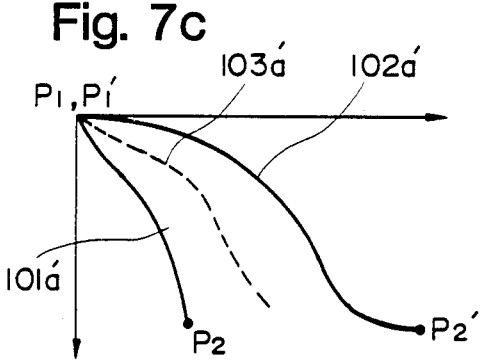

(3) By using the two given section curves 101a', 102a' lying in the predetermined plane obtained from step (2) above, an intermediate section curve 103a' is generated in said plane [FIG. 7(c)].

Figure 7D:
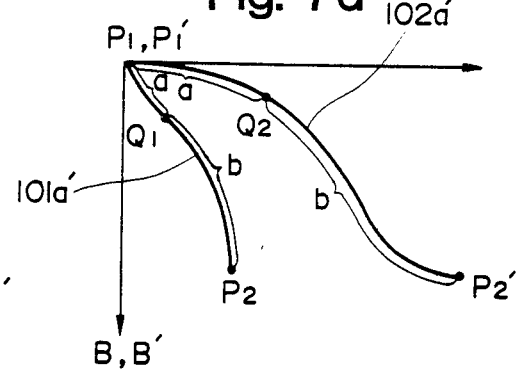

The intermediate section curve 103a is generated through the following procedure:

(3-1) Points Q1, Q2, which partition the lengths of the respective given section curves 101a', 102a' each into a ratio of a:b, are found [FIG. 7(d)]. The following steps (3-1-1) through (3-1-4) are observed to find the points that partition the given section curves 101a', 102a' into the ratio a:b:

(3-1-1) The length of each element constituting the given section curves is found (where the term "element" is taken to mean a line segment or an arc constituting the given curve), and these lengths are added together to find the total length D of each curve.

(3-1-2) D' is evaluated from $$\frac{a}{a+b} \cdot D = D'.$$

(3-1-3) An element is extracted containing a point at a distance D' from one end, which point serves as a reference point for partitioning. If $D_1$ is taken as the length of the initial element, $D_2$ as the length of the next element, $D_i$ as the length of the i-th element and so on, the extraction of elements is carried out by finding the k that satisfies the following inequality:

$$\sum_{i=1}^{k-1} D_i \leq D' \leq \sum_{i=1}^{k} D_i$$

(3-1-4) This step is to find the point on the k-th element whose distance from the starting point thereof is D", where D" is found from:

$$D'' = D' - \sum_{i=1}^{k-1} D_i$$

The obtained point is that which partitions the given curve into the ratio m:n from one end thereof. It will be assumed that, in step (3-1-3), $$\sum_{i=1}^{k-1} D_i = 0$$

when k=1.

Figure 7E:
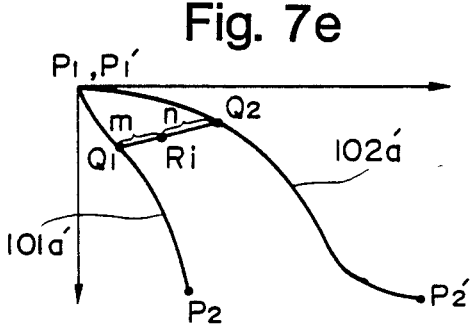

(3-2) A dividing point $R_i$ is computed, which point partitions a straight line connecting the dividing points Q1, Q2 at the partitioning ratio m:n of step (1). [See FIG. 7(e)]

If we let the coordinates of the dividing points Q1, Q2 be $(x_1, y_1)$ and $(x_2, y_2)$, respectively, then the coordinates $R_i$ (X,Y) of the dividing point $R_i$ may be calculated from:

$$X = x_1 + \frac{m}{m+n}(x_2 - x_1)$$

$$Y = y_1 + \frac{m}{m+n}(y_2 - y_1)$$

Figure 7F:
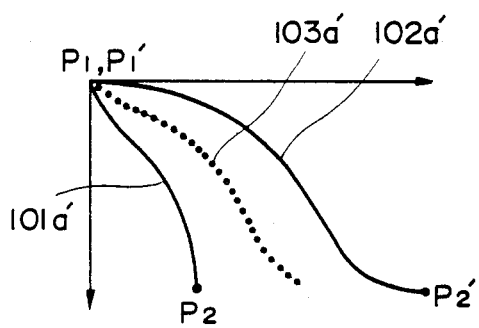

(3-3) The intermediate section curve 103a' is generated by a series of points $R_i$ (i=1,2 . . . ) obtained by successively changing the value of the dividing ratio a/b of step (3-1) from 0 to 1 [FIG. 7(f)]. A smoother intermediate section curve 103a' can be obtained by making the successive changes in the value of a/b very small.

(4) The intermediate section curve 103a' on the θ-H plane, which section curve was obtained from step (3) above, is transformed into a curve lying on the intermediate cylindrical surface 103 [FIG. 7(a)] in the defined space.

(2) Method II of generating a cylindrical intermediate section curve

This method is applicable to a case where the available data is data relating to one given cylindrical section curve and two reference curves. The cylindrical intermediate section is generated in accordance with Method I described above.

The procedure for generating a cylindrical intermediate section curve by Method II will now be described with reference to FIGS. 8(a) to 8(d).

(1) Section-related information (radius R) concerning the desired intermediate cylindrical surface 103 is obtained.

Figure 8A:
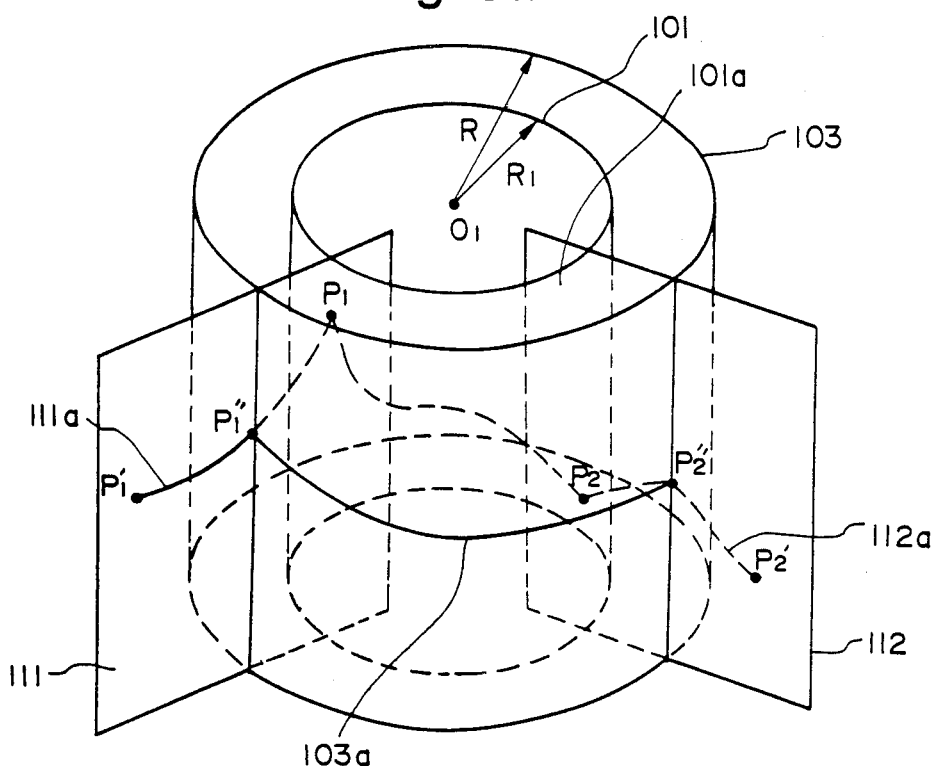
FIGS. 8(a) to 8(d) are illustrative views for describing a method II of generating a cylindrical intermediate section curve.
Figure 8B:
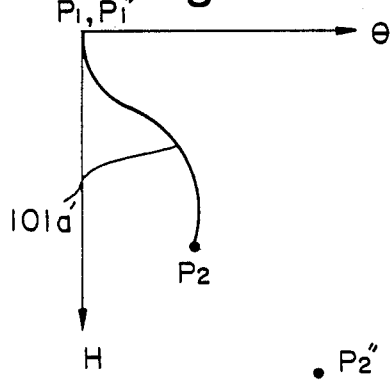

(2) The given cylindrical section curve 101a' on the given cylindrical surface 101, and the points of intersection P1", P2" of the intermediate cylindrical surface 103 and the first and second reference curves 111a, 112a, are transformed into a curve and points on the same plane (i.e., on the H-θ plane) [FIG. 8(b)].

It should be noted that the transformation into the curve and points on the same plane is performed through the same procedure consisting of the steps (2-1) through (2-3) of Method I for cylindrical intermediate section curve generation.

(3) The given cylindrical intermediate section curve 101a' and the points of intersection P1", P2" on the θ-H plane, as obtained in step (2), are used to generate a cylindrical intermediate section curve 103a' lying on said plane.

This intermediate section curve is generated through the following procedure:

(3-1) A computation is performed to obtain the ratio k/l of the length of the line segment connecting the starting point P1 and end point P2 of the given section curve 101a' resulting from the transformation into the predetermined plane, to the length of the line segment connecting the points of intersection P1", P2" which have also been transformed into points in the predetermined plane. In addition, an angle θ is computed. The angle θ is the angle of rotation through which the line segment P1P2 of the angle ∠P2P1P2" is rotated in the counter-clockwise direction to bring it into coincidence with the line segment P1"P2". The counter-clockwise direction is taken as the positive direction [FIG. 8(c)].

(3-2) The dividing point $S_i$ that divides the given section curve 101a' into a ratio of a:b is computed according to the method of steps (3-1-1) through (3-1-4) as described in connection with Method I of generating a cylindrical intermediate section [FIG. 8(c)].

Figure 8C:
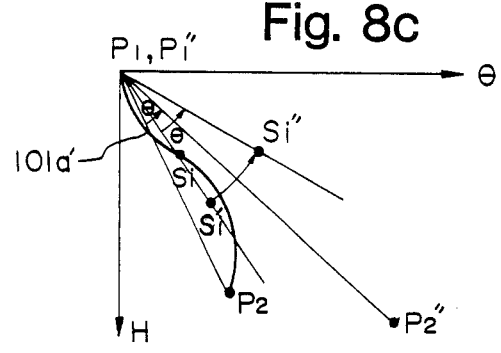

(3-3) A computation is performed to find a point $S_i''$ which results when an external dividing point $S_i'$, for externally dividing the line segment $P_iS_i$ into a ratio of k:l, is rotated through the angle θ [FIG. 8(c)].

Letting $(x_i, y_i)$ represent the coordinates of the dividing point Si that divides the given section curve 101a' into a ratio of a:b, letting $(x_o, y_o)$ represent the coordinates of the point P1, and letting (X, Y) represent the coordinates of the point $S_i''$, the coordinates of the point $S_i''$ are found from:

$$X = x_o + \frac{l(x_i - x_o)}{k} \cdot \cos\theta - \frac{l(y_i - y_o)}{k} \cdot \sin\theta$$

-continued
$$y = y_o + \frac{l(x_i - x_o)}{k} \cdot \sin\theta - \frac{l(y_i - y_o)}{k} \cdot \cos\theta$$

Figure 8D:
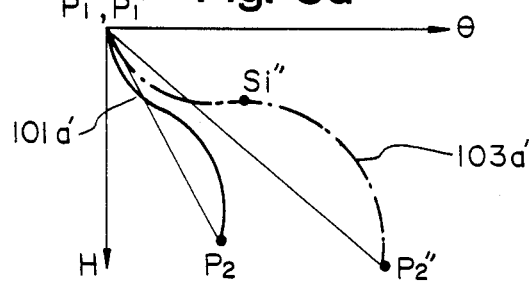

(3-4) The cylindrical intermediate section curve 103a' is generated by a series of points $S_i''$ (i=1,2,3 ... ) obtained by successively changing the value of the dividing ratio a/b of step (3-2) from 0 to 1 [FIG. 8(d)]. A smoother intermediate section curve 103a' can be obtained by making the successive changes in the value of a/b very small.

(4) The intermediate section curve 103a' on the θ-H plane, which section curve was obtained from step (3) above, is transformed into a curve lying on the intermediate cylindrical surface 103 [FIG. 8(a)] in the defined space.

(3) Method III of generating a cylindrical intermediate section curve

This method is applicable to a case where the available data is data relating to two given cylindrical section curves and two reference curves. The cylindrical intermediate section is generated in accordance with Method II described above.

The procedure for generating a cylindrical intermediate section curve by Method III will now be described with reference to FIGS. 9(a) to 9(d). Here Method III is a combination of the Methods I and II for cylindrical intermediate section curve generation.

(1) Information (the dividing ratio m/n, etc.) concerning the desired cylindrical intermediate section is obtained.

Figure 9A:
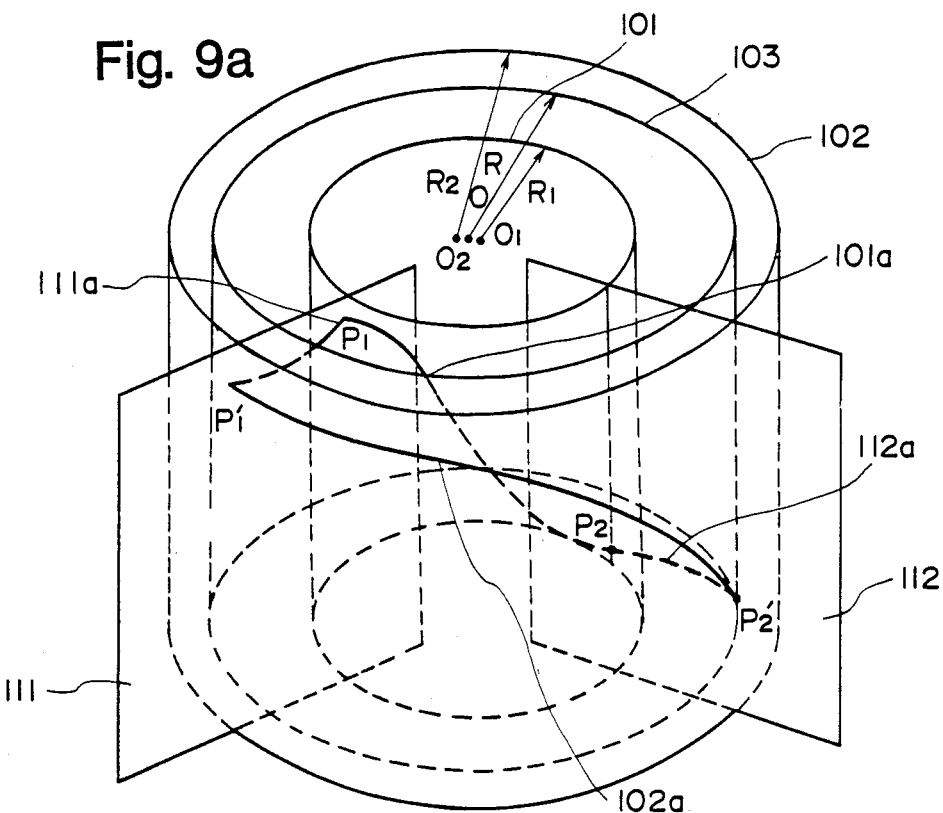
FIGS. 9(a) to 9(d) are illustrative views for describing a method III of generating a cylindrical intermediate section curve.
Figure 9B:
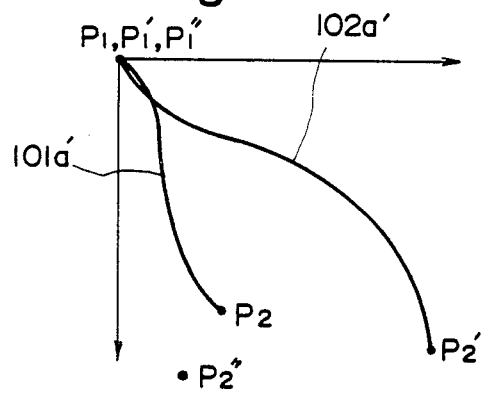

(2) The given cylindrical intermediate section curves 101a, 102a on the given cylindrical surfaces 101, 102 and the points of intersection P1", P2" of the intermediate cylindrical surface 103 and first and second reference curves 111a, 112a are transformed into curves and points on the same plane (on the θ-H plane) [FIG. 9(b)].

This transformation into the same plane is performed through the same procedure, consisting of the steps (2-1) through (2-3), described above in connection with Method I for cylindrical intermediate section curve generation.

Figure 9C:
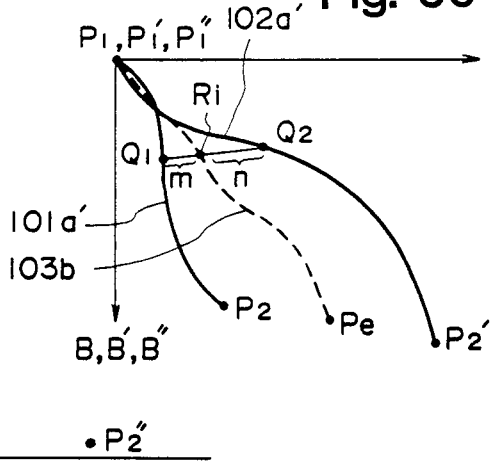

(3) The given cylindrical intermediate section curves 101a', 102a' on the predetermined plane obtained in step (2) above are used to generate a reference cylindrical intermediate section curve 103b lying on said plane [FIG. 9(c)]. This reference cylindrical intermediate section curve 103b is generated through the same procedure, consisting of steps (3-1) through (3-3), described in connection with Method I for cylindrical intermediate section curve generation.

(4) The reference cylindrical intermediate section curve 103b and the points of intersection P1", P2" on the predetermined plane obtained in step (3) above are used to generate a cylindrical intermediate section curve 103a' on said plane. This cylindrical intermediate section curve 103a' is generated through the same procedure, consisting of steps (3-1) through (3-4), described in connection with Method II for cylindrical intermediate section curve generation [FIG. 9(d)].

Figure 9D:
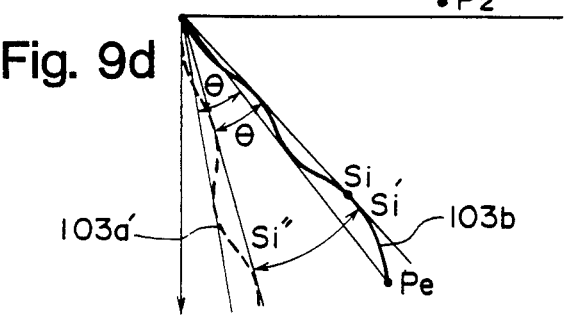

(5) The cylindrical intermediate section curve 103a' on the θ-H plane obtained in step (4) above is transformed into a curve on the intermediate cylindrical surface 103 in the defined space [FIG. 9(d)].

(4) Method IV of generating a cylindrical intermediate section curve

Figure 10A:
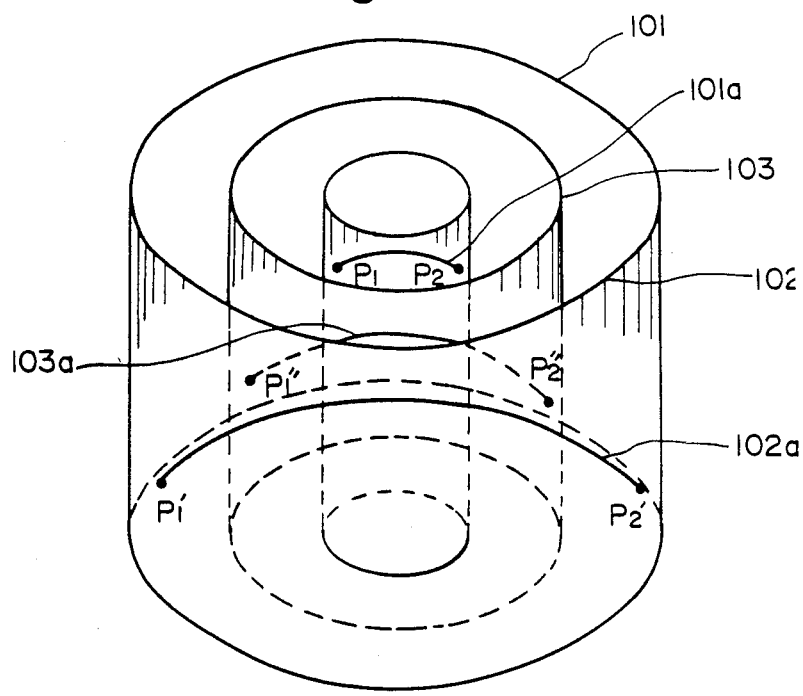
FIGS. 10(a) and 10(b) are illustrative views for describing a method IV of generating a cylindrical intermediate section curve.

This method is applicable to a case where the available data is data relating to two given cylindrical section curves as shown in FIG. 10(a). The cylindrical intermediate section is generated in accordance with Method II described above.

(1) Section-related information (the dividing ratio m:n) concerning the desired intermediate cylindrical surface 103 is found.

Figure 10B:
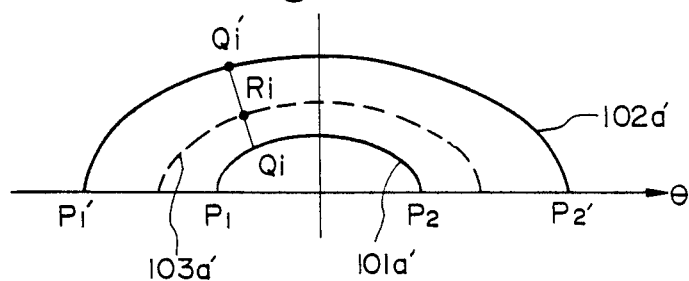
Figure 11A:
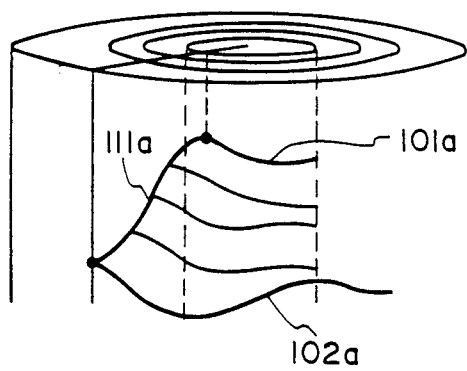
FIGS. 11(a) to 11(e) illustrate curved surfaces created by the present invention.
Figure 11D:
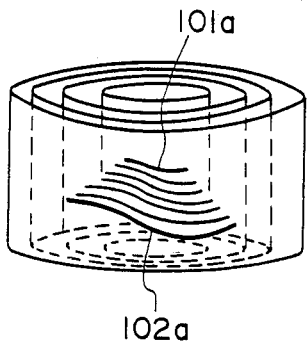
Figure 11B:
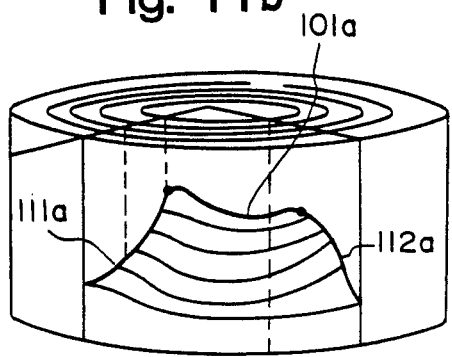
Figure 11E:
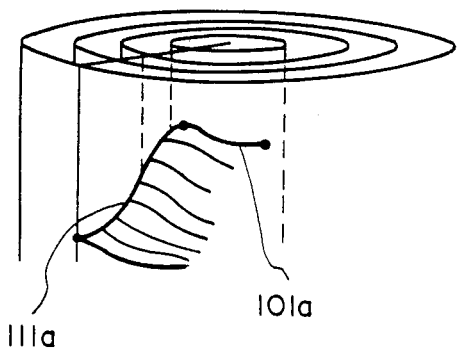
Figure 11C:
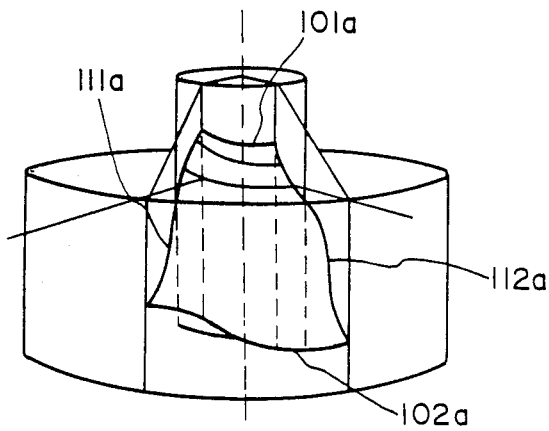

(2) The given cylindrical section curves 101a, 102a are developed into curves on the same predetermined plane (on the θ-H plane) [FIG. 10(b)].

(3) The cylindrical intermediate section curve 103a' on the θ-H plane is found after connecting the corresponding points Qi, Qi' and obtaining the point $R_i$ (i=1,2 . . . ) that internally divides the connecting line into the ratio m:n.

(4) The intermediate section curve 103a' on the θ-H plane obtained in step (3) above is transformed into a curve on the intermediate cylindrical surface 103 in the defined space [FIG. 10(a)].

[IV] Processing for curved surface generation

A number of the given section curves 103a are obtained when the foregoing processing for cylindrical intermediate section generation and processing for cylindrical intermediate section curve generation are repeated while successively changing the dividing ratio m:n from 0:1 to 1:0 or while successively increasing the radius R. A smooth curved surface can then be generated by connecting these curves. A smoother curved surface can be obtained by making the successive changes in the ratio m:n very small. FIGS. 11(a) to 11(e) show examples of surfaces generated by the method of the present invention, in which 11(a) through 11(d) are for cases where the surfaces are generated by Methods I through IV of cylindrical intermediate section curve generation, respectively, and in which (e) is for a case where one cylindrical section curve 101a and a reference curve 111a are given.

Figure 12:
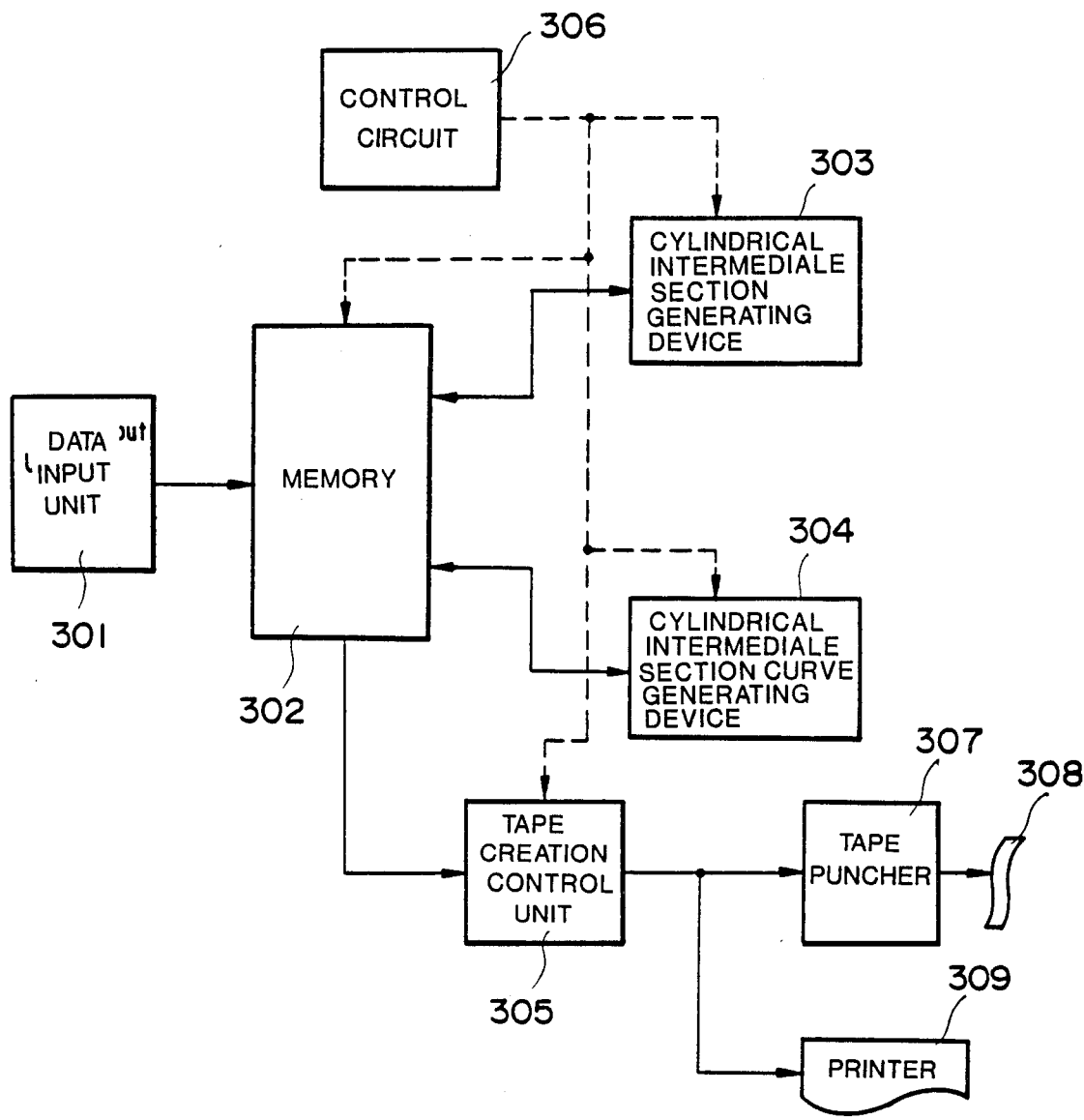
FIG. 12 is a block diagram of a curved surface generating apparatus for practicing the present invention.

FIG. 12 is a block diagram showing a curved surface generating apparatus for practicing the present invention. In the Figure, numeral 301 denotes a data input unit for entering section data (reference sections, cylindrical sections) and section curve data (reference curves, cylindrical section curves) given on the blueprint, as well as for entering other data. Numeral 302 denotes a memory for storing the section data and section curve data, as well as cylindrical intermediate section data and cylindrical intermediate section curve data and the like generated by a cylindrical intermediate section generating device and cylindrical intermediate section curve generating device which will be described below. Numeral 303 denotes the cylindrical intermediate section generating device which generates a cylindrical intermediate section using the section data and section curve data stored in the memory 302, as well as information indicative of which of the Methods I and II for cylindrical intermediate section generation is to be used to generate a cylindrical intermediate section (intermediate cylindrical surface), and which stores the cylindrical intermediate section data, relating to the cylindrical intermediate section, in the memory 302. Numeral 304 denotes the cylindrical intermediate section curve generating device which, using the section data, section curve data and cylindrical intermediate section data, as well as information indicative of which of the Methods I through IV for cylindrical intermediate section curve generation is to be used to generate a cylindrical intermediate section curve, generates the particular cylindrical intermediate section curve in accordance with the abovementioned steps, and which stores the cylindrical intermediate section curve data, relating to the cylindrical intermediate section curve, in the memory 302. Numeral 305 denotes a tape creation control unit for reading, from the memory 302, such data as the stored cylindrical intermediate section data and stored data relating to the cylindrical intermediate section curves lying on the cylindrical intermediate sections, and for delivering this data upon converting it into an NC tape format for machining a metal mold or the like. Numeral 306 denotes a control circuit for controlling the memory 302, cylindrical intermediate section generating device 303, cylindrical intermediate section curve generating deviced 304, and tape creation control unit 305. Numeral 307 denotes a tape puncher, 308 a paper tape, and 309 a printer.

This apparatus for generating curved surfaces sequentially generates cylindrical intermediate section curves in accordance with the processing steps for cylindrical intermediate section generation and cylindrical intermediate section curve generation, described above, and converts the cylindrical intermediate section curve data into a tape format before delivering the data to the tape puncher 307 or printer 309.

Industrial Applicability

In a case where cylindrical sections and cylindrical section curves lying in these sections are given, the present invention makes it possible to create the surface bounded by these curves. In addition, the method of the present invention makes it possible to create, in a simple manner, sophisticated three-dimensional bodies through processing by a small-scale computer. With the conventional computerized methods, on the other hand, the patch system requires the processing of large quantities of data and complicated mathematical processing, and requires also the use of a large-scale computer, while the system which enables the use of a small computer does not permit a three-dimensional tool offset, limits movement of the cutting tool and places a restriction upon the machined shape, thereby making it impossible to create sophisticated three-dimensional surfaces.

Combining the method of the present invention with the previously proposed method of surface creation will make it possible to create almost any mold surface required in NC machining. The present invention therefore has a very high degree of industrial application.

What is claimed is:

1. A method of generating a curved surface of a three dimensional body, comprising providing at least two given sections and respective given section curves to include at least a first given cylindrical section and a respective first given cylindrical section curve, each said given cylindrical section having an axis parallel to a first direction, generating a plurality of intermediate cylindrical sections so that the axis of each said cylindrical intermediate section is parallel to said first direction, and so that each said given and intermediate cylindrical section does not intersect each other, and generating a respective intermediate cylindrical section curve in said intermediate section from said given section curves in said given sections, and from the respective radii, and any separation between the axes, of the given and intermediate cylindrical sections, wherein, when said given sections and respective given section curves include only one given cylindrical section and one respective given cylindrical section curve, then all of said given and intermediate cylindrical sections are concentric and said given sections and respective given section curves include two reference sections and respective reference section curves.

2. The method of claim 1, comprising providing a second one of said given cylindrical sections that is non-concentric with said first given cylindrical section and a respective second one of said given cylindrical section curves, the respective radii of said first and second given cylindrical sections being $R_1$ and $R_2$, forming a first straight line connecting the axes of said first and second given cylindrical sections, and dividing said first straight line at each of a plurality of dividing points into a respective plurality of pairs of lengths m and n, each said pair of lengths defining a respective ratio m/n, taking a respective plurality of second straight lines that are parallel to said first direction and which pass through said dividing points as the axes of respective ones of said intermediate cylindrical sections, and generating each respective one of said intermediate cylindrical sections in such a manner that its radius R is $$R = R_1 + m(R_2 - R_1)/(m+n)$$

for the respective values of m and n.

3. The method of claim 2, comprising providing said given sections and given section curves to include a reference section and a respective reference section curve, said reference section having respective lines of intersection with said first and second given cylindrical sections, and said reference section curve having respective points $P_1$, $P_1'$ of intersection with said first and second cylindrical section curves, developing said first and second given cylindrical section curves in a first plane, computing each said intermediate cylindrical section curve in said first plane based on the respective ratio m/n and on said first and second given cylindrical section curves, and transforming each intermediate cylindrical section curve in said first plane into the respective intermediate cylindrical section in such a manner that each said intermediate cylindrical section curve has a respective point of intersection $P_1'''$ with the given reference section curve.

4. The method of claim 3, wherein said developing of said first and second given cylindrical section curves, and said computing of each intermediate cylindrical section curve for each said ratio m/n in said first plane, comprises transforming each of said first and second given cylindrical section curves into a predetermined plane coordinate system in said first plane in such a manner that said points of intersection $P_1$ and $P_1'$, of the first and second given cylindrical section curves with the reference section curve, coincide, and that said lines of intersection of each of the first and second given cylindrical sections with said reference section coincide, computing a respective first point $Q_1$, $Q_2$, on said first and second cylindrical section curves, by internally dividing into a ratio of a/b each of said first and second cylindrical section curves transformed into said predetermined plane coordinate system, and by internally dividing into the respective ratio of m/n a third straight line connecting the respective first points $Q_1$, $Q_2$ on said first and second given cylindrical section curves, and computing the respective intermediate cylindrical section curve in said predetermined plane coordinate system for each said ratio m/n by computing a plurality of said first points corresponding to a plurality of values for the ratio a/b.

5. The method of claim 1, comprising providing said given sections and given section curves to include two reference section curves and respective reference section curves, wherein said first given cylindrical section intersects each of said two reference sections at respective first and second intersection lines and the first and second of said two reference section curves intersect said first given cylindrical section curve at respective starting and end points $P_1$, $P_2$ said first given cylindrical section curve, and all of said given and intermediate cylindrical section curves are concentric, developing in a first plane respective points of intersection $P_1''$, $P_2''$ of each said intermediate cylindrical section with the first and second reference section curves, computing each respective intermediate cylindrical section curve in said first plane by using said first given cylindrical section curve, and transforming each said intermediate cylindrical section curve in said first plane into respective intermediate cylindrical section in such a manner that respective starting and end points of the respective intermediate cylindrical section curve coincide with the respective points of intersection $P_1''$, $P_2''$ of the respective intermediate cylindrical section curve with the two reference section curves.

6. The method of claim 5, said developing of said points of intersection $P_1''$, $P_2''$ and said computing of each said intermediate cylindrical section curve in said first plane including transforming said first given cylindrical section curve and the respective points $P_1''$, $P_2''$ into a predetermined plane coordinate system in such a manner that said point $P_1$ and the respective point $P_1''$ coincide and said first and second intersection lines coincides, computing a ratio $l_1/l_2$, wherein $l_1$ is the length of a straight line $P_1P_2$ connecting said points $P_1$ and $P_2$ in said predetermined plane coordinate system and $l_2$ is the length of a straight line $P_1''P_2''$ connecting said points $P_1''$, $P_2''$ in said predetermined plane coordinate system, finding a point $S_i$ which internally divides said first given cylindrical section curve in said predetermined plane coordinate system into a selected ratio of a/b, computing a first angle equal to the angle between said straight line $P_1P_2$ and said straight line $P_1''P_2$, computing a point $S_i''$ obtained upon rotating by said first angle, around the point $P_1$ in said predetermined plane coordinate system, a further point $S_i'$ which is defined by extending the line $P_1S_i$ by the factor $l_2/l_1$, and generating the respective intermediate cylindrical section curve in said predetermined plane coordinate system by finding a plurality of said points $S_i''$ corresponds to different values for said ratio a/b.

7. The method of claim 1, comprising providing said given sections and section curves to include a second given cylindrical section and a respective second given cylindrical section curve, said first and second given cylindrical sections having respective radii $R_1$ and $R_2$, and first and second reference sections and respective first and second reference section curves, each of said first and second given cylindrical section curves intersecting said first reference section curve at respective points $P_1$ and $P_1'$, each of said first and second given cylindrical section curves intersecting said second reference section curve at respective points $P_2$ and $P_2'$, and each of said first and second reference sections intersecting at respective intersecting lines each of said first and second given cylindrical sections, dividing a first straight line connecting the axes of the first and second given cylindrical sections at each of a plurality of dividing points into a respective pair of lengths m and n defining a respective ratio m/n, forming a plurality of second straight lines passing through said dividing points as the respective axes of said intermediate cylindrical sections, generating each said intermediate cylindrical section with a respective radius R given by $$R = R_1 + m(R_2 - R_1)/(m+n)$$

for the respective values of m and n, developing said first and second given cylindrical section curves with respective starting and end points $P_1$ corresponding to said points of intersection $P_1$, $P_2$ and $P'_1$, $P'_2$ with the first and second given reference curves in a first plane, computing each said intermediate cylindrical section curve in said first plane, corresponding to each respective ratio m/n, by using said first and second given cylindrical section curves, and transforming each said intermediate cylindrical section curve in said first plane into the respective intermediate cylindrical section in such a manner that respective starting and end points $P_1''$, $P_2''$ of each intermediate cylindrical section curve coincide with the respective points of intersection of the intermediate cylindrical section with said first and second reference curves.

8. The method of claim 7, said developing and computing in said first plane, for each respective m/n ratio, comprising transforming into a predetermined plane coordinate system in said first plane each of said first and second given cylindrical section curves and the respective starting and end points $P_1''$, $P_2''$ of each respective intermediate cylindrical section in such a manner that said points $P_1$, $P_1'$ of intersection of said given cylindrical section curves with first said reference section curve, and said point $P_1''$ of intersection of each respective intermediate cylindrical section curve with said first reference section curve coincide, and all of said lines of intersection of the first reference section with said first and second given cylindrical sections coincide, computing a point Ri by internally dividing, at respective dividing points $Q_1$, $Q_2$, into a ratio of a/b, each of said first and second given cylindrical section curves transformed into said predetermined plane coordinate system, and by internally dividing a third straight line connecting the dividing points Q1, Q2, according to the respective m/n ratio, generating a respective further curve $P_1Pe$ for each said intermediate cylindrical section curve by computing a plurality of said points Ri with respectively different internal dividing ratios a/b, said curve $P_1Pe$ having an end point Pe corresponding to said dividing point corresponding to said points $P_2$, $P_2'$, computing a ratio $l_1/l_2$, wherein $l_1$ is the length of a straight line $P_1Pe$ connecting the starting point $P_1$ and the end point Pe of said curve $P_1Pe$ and $l_2$ is the length of a straight line $P_1P_2''$ connecting said points $P_1$, $P_2''$ transformed into the plane coordinate system, computing a first angle in said plane coordinate system between said straight line $P_1Pe$ and said straight line $P_1P_2$, computing a point $S_i''$ obtained upon rotating by said first angle a further point $S_i'$ which is defined by extending said straight line $P_1S_i$ by a factor of $l_2/l_1$, and generating each respective intermediate cylindrical section curve in said predetermined plane coordinate system by finding a plurality of said points $S_i''$ having corresponding different values for the ratio a/b.

9. The method of claim 1, comprising providing said given sections and given section curves to include a second cylindrical section curve in a respective second cylindrical section, said first and second given cylindrical sections being non-concentric and having respective radii $R_1$, $R_2$, dividing a first straight line connecting the axes of the first and second given cylindrical sections by a plurality of dividing points into a plurality of pairs of lengths m and n, each said pair of lengths defining a respective ratio m/n, taking a plurality of second straight lines passing through said dividing points as the respective axes of said intermediate cylindrical sections, and generating each said intermediate cylindrical section with a respective radius R given by $$R = R_1 + m(R_2 - R_1/(m+n)$$

for the respective pair of lengths m and n, developing each of said first and second given cylindrical section curves in a first plane, generating an intermediate cylindrical section curve for each of said length ratios m/n by connecting with a third straight line corresponding points on each of the first and second given cylindrical section curves in the first plane and finding the dividing point on each said third straight line which divides the second straight line into the respective ratio m/n, and transforming each generated intermediate cylindrical section curve into the respective intermediate cylindrical section.

10. A method of generating a curved surface of a three dimensional body, comprising providing at least two given sections and respective given section curves to include at least a first given cylindrical section and a respective first given cylindrical section curve, each said given cylindrical section having an axis parallel to a first direction, generating a plurality of intermediate cylindrical sections in such a manner that the axis of each said cylindrical intermediate section is parallel to said first direction, and each said given and intermediate cylindrical section does not intersect each other, and generating a respective intermediate cylindrical section curve in each said intermediate cylindrical section from said given section curves, and from the radii, and any separation between the axes, of the given and intermediate cylindrical sections.

11. The method of claim 10, comprising providing said given sections and given section curves to include two reference section curves and respective reference sections, wherein said first given cylindrical section intersects each of said two reference sections at respective first and second intersection lines and the first and second of said two reference section curves intersect said first given cylindrical section curve at respective starting and end points $P_1$, $P_2$ of said first given cylindrical section curve, developing in a first plane respective points of intersection $P_1''$, $P_2''$ of each said intermediate cylindrical section with the first and second reference section curves, computing each respective intermediate cylindrical section curve in said first plane by using said first given cylindrical section curve, and transforming each said intermediate cylindrical section curve in said first plane into respective intermediate cylindrical section so that respective starting and end points of the respective intermediate cylindrical curve coincide with the respective points of intersection $P_1''$, $P_2''$ of the respective intermediate cylindrical section curve with the two reference section curves.

12. The method of claim 11, said developing of said points of intersection $P_1''$, $P_2''$ and said computing of each said intermediate cylindrical section curve in said first plane including transforming said first given cylindrical section curve and the respective points $P_1''$, $P_2''$ into a predetermined plane coordinate system in such a manner that said point $P_1$ and the respective point $P_1'$ coincide and said first and second intersection lines coincide, computing a ratio $l_1/l_2$, wherein $l_1$ is the length of a straight line $P_1P_2$ connecting said points $P_1$ and $P_2$ in said predetermined plane coordinate system and $l_2$ is the length of a straight line $P_1''P_2''$ connecting said points $P_1''$, $P_2''$ in said predetermined plane coordinate system, finding a point $S_i$ which internally divides said first given cylindrical section curve in said predetermined plane coordinate system into a selected ratio of a/b, computing a first angle equal to the angle between said straight line $P_1P_2$ and said straight line $P_1''P_2''$, computing a point $S_i''$ obtained upon rotating by said first angle, around the point $P_1$ in said predetermined plane coordinate system, a further point $S_i'$ which is defined by extending the line $P_1S_i$ by the factor $l_2/l_1$, and generating the respective intermediate cylindrical section curve in said predetermined plane coordinate system by finding a plurality of said points $S_i''$ corresponding to different values for said ratio a/b.

13. The method of claim 10, comprising providing said given sections and section curves to include two cylindrical sections of radii $R_1$ and $R_2$, wherein $R_2 > R_1$, and two respective cylindrical sections, and providing each said intermediate cylindrical section to have a radius R given by a respective ratio m/n according to $$m/n = (R - R_1)/(R_2 - R)$$

wherein the ratio m/n is the ratio of the separation between the given cylindrical section of radius $R_1$ and the respective intermediate cylindrical section to the spacing between the respective intermediate cylindrical section and the given cylindrical section of radius $R_2$.

* * * * *